(12) United States Patent
Lee et al.

(10) Patent No.: US 8,469,302 B2
(45) Date of Patent: Jun. 25, 2013

(54) SEATBELT RETRACTOR

(75) Inventors: Hyung Chan Lee, Seoul (KR); Sang Hee Park, Busan (KR); Il Hwan Park, Kimhae-si (KR); Gyu Ryul Cho, Changwoon-si (KR)

(73) Assignee: Samsong Industries, Ltd., Seoul (KR)

( * ) Notice: Subject to any disclaimer, the term of this patent is extended or adjusted under 35 U.S.C. 154(b) by 368 days.

(21) Appl. No.: 12/524,567

(22) PCT Filed: Dec. 6, 2007

(86) PCT No.: PCT/KR2007/006299
§ 371 (c)(1),
(2), (4) Date: Mar. 29, 2010

(87) PCT Pub. No.: WO2008/091059
PCT Pub. Date: Jul. 31, 2008

(65) Prior Publication Data
US 2010/0301153 A1    Dec. 2, 2010

(30) Foreign Application Priority Data
Jan. 24, 2007   (KR) .................... 10-2007-0007307

(51) Int. Cl.
*B65H 75/48* (2006.01)
(52) U.S. Cl.
USPC .................. 242/384.4; 242/384.5; 242/384.6

(58) Field of Classification Search
USPC ..................... 242/384, 384.4–384.6
See application file for complete search history.

(56) References Cited

U.S. PATENT DOCUMENTS

| | | | | |
|---|---|---|---|---|
| 4,978,087 A * | 12/1990 | Tauber | | 242/384.4 |
| 5,441,209 A * | 8/1995 | Fujimura et al. | | 242/384 |
| 5,622,383 A * | 4/1997 | Kielwein et al. | | 280/806 |
| 6,230,997 B1 * | 5/2001 | Palliser | | 242/384.4 |
| 6,299,093 B1 * | 10/2001 | Harte et al. | | 242/384.4 |
| 6,547,175 B2 * | 4/2003 | Kielwein et al. | | 242/384.6 |

FOREIGN PATENT DOCUMENTS

| | | |
|---|---|---|
| JP | 06-037023 | 5/1994 |
| JP | 10-157569 | 6/1998 |
| KR | 20-1999-0034284 | 8/1999 |

* cited by examiner

*Primary Examiner* — Sang Kim
(74) *Attorney, Agent, or Firm* — Christopher Paul Mitchell

(57) ABSTRACT

This is the current invention of the components or their construction for the seat belt retractor. The invention enables the fitting angle of the seat belt to be adjustable to the specified range of the vehicle stabilization, deceleration/acceleration sensor. The bracket holder is constructed on the holder sensor, and contains the formation of the No. 1 hole, and the No. 2 hole that locks onto the No. 1 or 2 cylinders selectively. The retractor is adjustable to the biased angle to maintain its horizontality according to the vehicle's dynamic slope and rapid deceleration/acceleration.

3 Claims, 6 Drawing Sheets

B-B

Fig. 8
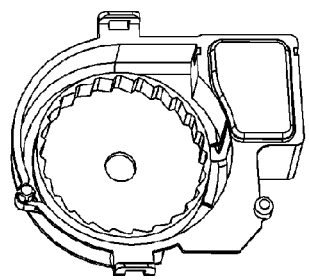
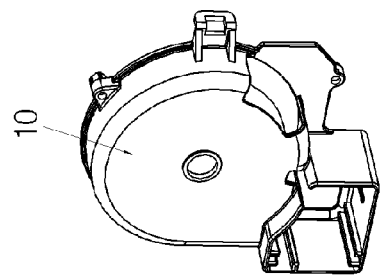
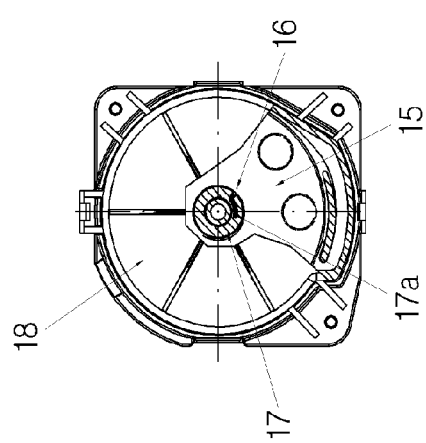

SEATBELT RETRACTOR

RELATED APPLICATIONS

This application is a 371 application of International Application No. PCT/KR2007/006299, filed Dec. 6, 2007, which in turn claims priority from Korean Patent Application No. 10-2007-0007307, filed Jan. 24, 2007, both of which are incorporated herein by reference.

TECHNICAL FIELD

An embodiment of the invention relates to a seat belt retractor of a vehicle. More specifically, an embodiment enables the fitting angle of the seat belt to be adjustable to the specified range of the vehicle stabilization, deceleration/acceleration sensor.

BACKGROUND ART

A seat belt functions to restrain a passenger's body in a seat by inhibiting excessive speed of webbing withdrawal when a vehicle is engaged in cornering, rapid acceleration or deceleration.

In general, a seat belt retractor comprises a retraction spring that actuates the rotation power of a spool for retraction and protraction of webbing. The seat belt retractor further comprises a frame that is secured on the vehicle to support the load and weight imposed on the webbing. The seat belt retractor further comprises a locking pulley that prevents the rotation of the spool in the direction of the webbing being withdrawn. The seat belt retractor further comprises a sensor that detects rapid protraction of the webbing. The seat belt retractor further comprises a sensor that detects the vehicle's stability and rapid acceleration/deceleration. Particularly, the stability sensor may be be fitted in balance aligned with the vehicle.

At present, various mechanisms and systems are employed for each particular vehicle model. Such requires additional design and design time to maintain each vehicle's stability and sensors as the installation angle of the stability sensor for each make is slightly different. The arbor that transmits the rotation force to the spool by fastening the retraction spring tends to become separated during spring winding, and also noisy during protraction and retraction of the webbing. Operational failure of the webbing during or after manufacturing causes problems associated with complicated assembly processes.

SUMMARY

Technical Problem

For the problems mentioned above, an embodiment of the invention provides excellent solutions that enable the assembly angle to be adjustable to the vehicle's stability and the sensors for deceleration/acceleration, thus offering component compatibility and availing retractor designs for different vehicle models.

Another function of an embodiment of the current invention lies with the arbor, which transmits the rotation force to the spool constructed to prevent slippage during the winding of the retraction spring.

Another purpose of an embodiment of the current invention is to render the assembly process with the sub-assembly to make the assembly easier and shorten production time.

Technical Solution

To achieve the above purposes, an embodiment of the current invention employs the following technical means:

Constructing a sensor holder, which secures a seat belt retractor to a vehicle with a cylinder that supports sensors for vehicle stability and rapid deceleration/acceleration. A row of second holes is formed left and right in a perpendicular line from a center of assembly holes that are formed around the sensor holder. A locking cylindrical hook for the $2^{nd}$ holes is inserted. The locking cylindrical hook and $2^{nd}$ holes compensate the biased angle the retractor is mounted to the vehicle and is constructed as fastening by the supporting rib, so that the sensors for vehicle stability and rapid deceleration/acceleration maintain parallelism to the vehicle. In addition, the marking of .+−. for identification may be labeled to the right and left on the $2^{nd}$ holes to help identify the installation position of the vehicle.

To prevent slippage of the arbor from the retraction spring during the arbor winding that transmits the rotation force of the retractor spring to the spool, the one end of the retraction spring is inserted into the holes, which are formed in an arc on the edge of the arbor.

For easy and quicker retractor assembly, sub-assemblies of the webbing sensor assembly, the locking assembly, the sensor assembly for vehicle stability and deceleration/acceleration, and the retraction spring assembly are preassembled in order to construct the entire retractor.

Advantageous Effects

As outlined in the above, embodiments of the invention provide excellent solutions, which enable the assembly angle to be adjustable according to the sensors for a vehicle's stability and deceleration/acceleration, with the alignment of the retractor being sustained. It also offers component compatibility for different vehicle makes; the arbor which transmits the rotation force to the spool (3) is constructed to prevent slippage during the winding of the retraction spring (16); and in addition an embodiment of the current invention renders the assembly process with the sub-assembly unit to make assembly easier and shorten assembly process time.

BRIEF DESCRIPTION OF THE DRAWINGS

FIG. 8 is a schematic representation of the Retraction Spring Assembly of FIG. 2.

DESCRIPTION OF SYMBOLS FOR MAIN SECTION OF DRAWING

Figure 1:
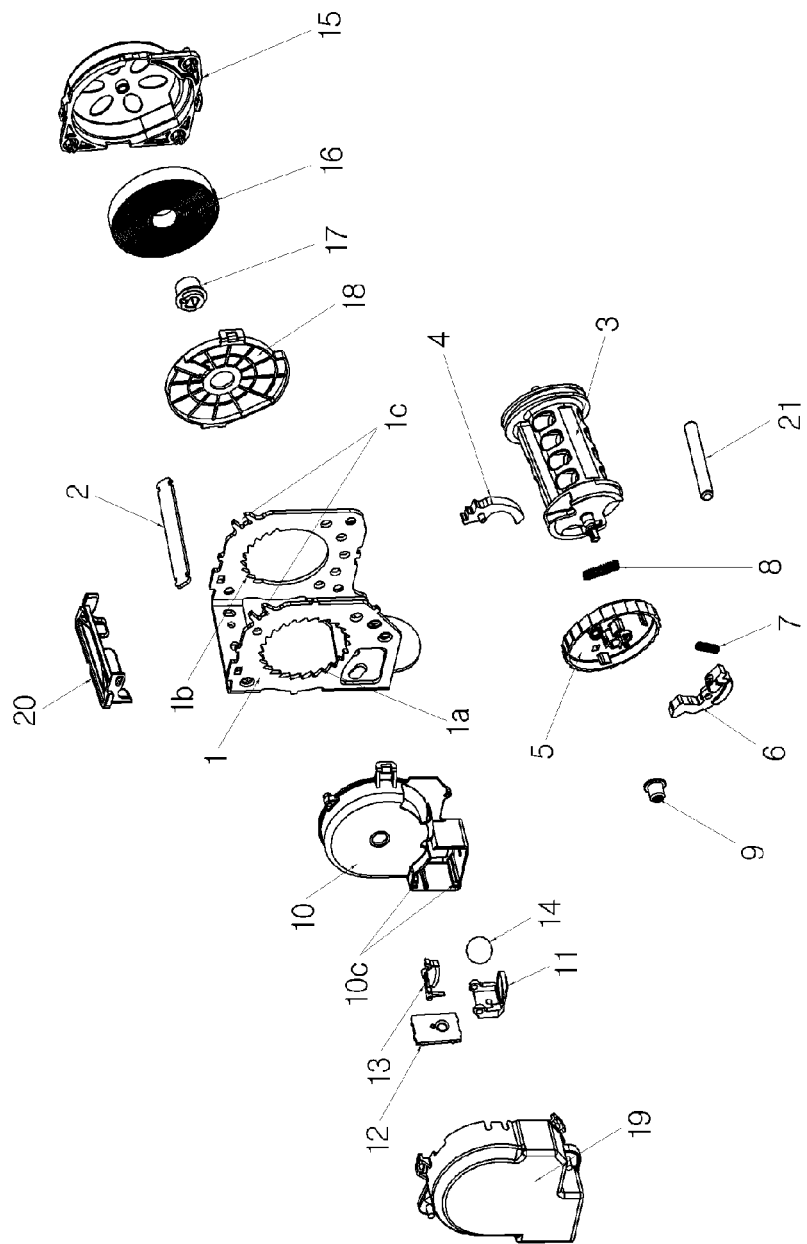
FIG. 1 is a schematic representation of a seat belt retractor according to an embodiment.

1. Frame 2. Bar support 3. Spool
4. Plate lock 5. Gear 6. Detent 7. Sensor spring 8. Return spring 9. Adaptor mechanism
10. Holder sensor 11. Sensor bracket
12. Bracket holder 13. Sensor lever
14. Sensor ball 15. Retraction spring cover
16. Retraction spring 17. Arbor
18. Spring seat 19. Sensor cover
20. Webbing guide 21. Webbing detent
22. Frame assembly 23. Webbing sensor assembly
24. Locking assembly 25. Sensor for stability and velocity
26. Return spring assembly

BEST MODE FOR CARRYING OUT THE INVENTION

An embodiment of the invention has the following significant characteristics of the seat belt retractor. For the holder sensor (10) assembled on the frame (1), the gear (5) that locks the rotating sensor lever (13) assembled on the spool (3), the sensor bracket (11) in which the sensor ball (14) is housed, having the slope in the form of a conical shape that maintains the fitting angle of the retractor parallel with the vehicle's dynamics. Also, this is for the bracket holder (12) that is assembled by the sensor bracket (11) and the detection sensor (25) for the vehicle's dynamic slope and rapid acceleration/deceleration.

MODE FOR THE INVENTION

The recommended application of an embodiment of the current invention is described in the drawings below.

Figure 2:
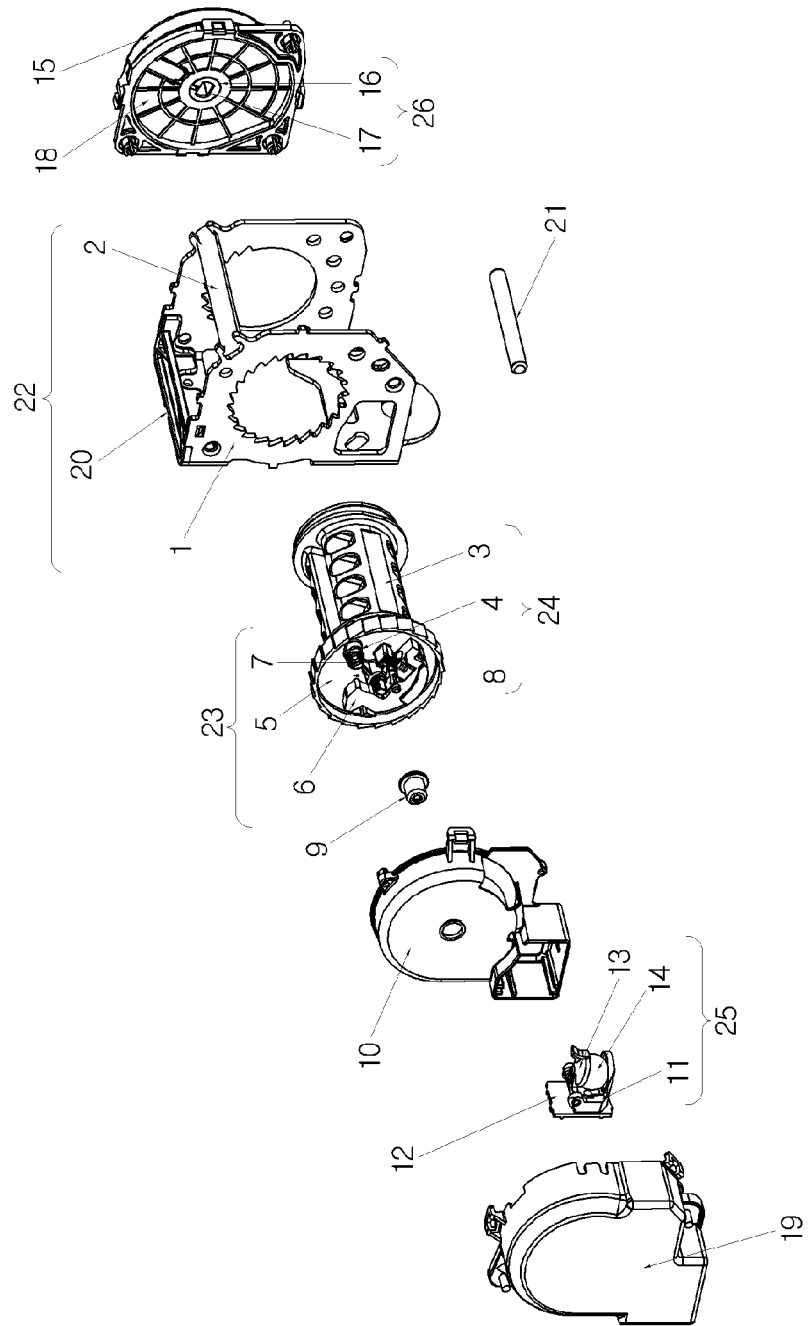
FIG. 2 is a schematic representation of a Sub-assembly of FIG. 1.
Figure 3:
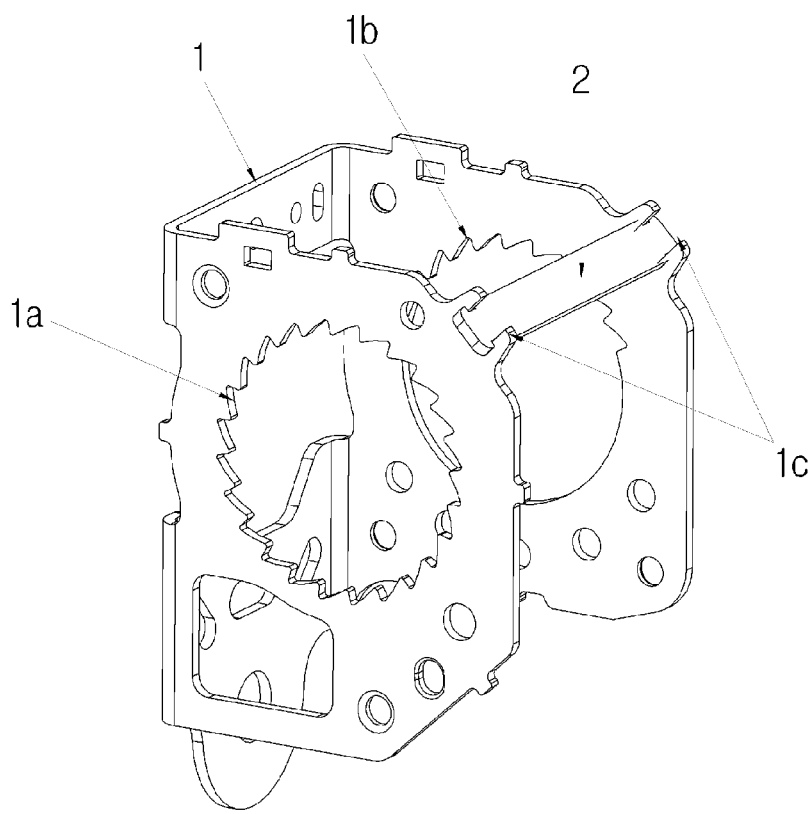
FIG. 3 is a schematic representation of the frame assembly of FIG. 2.
Figure 4:
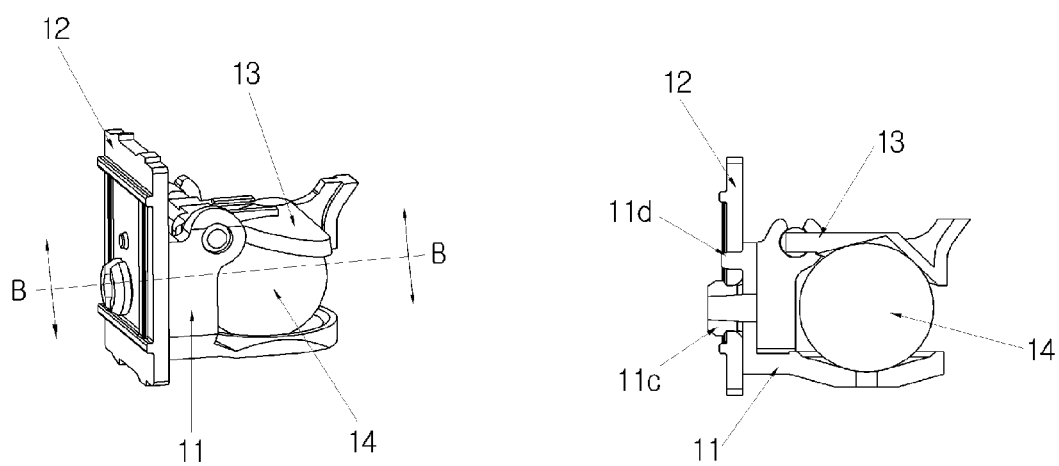
FIG. 4 is a schematic representation of the detection sensor of FIG. 2.
Figure 5:
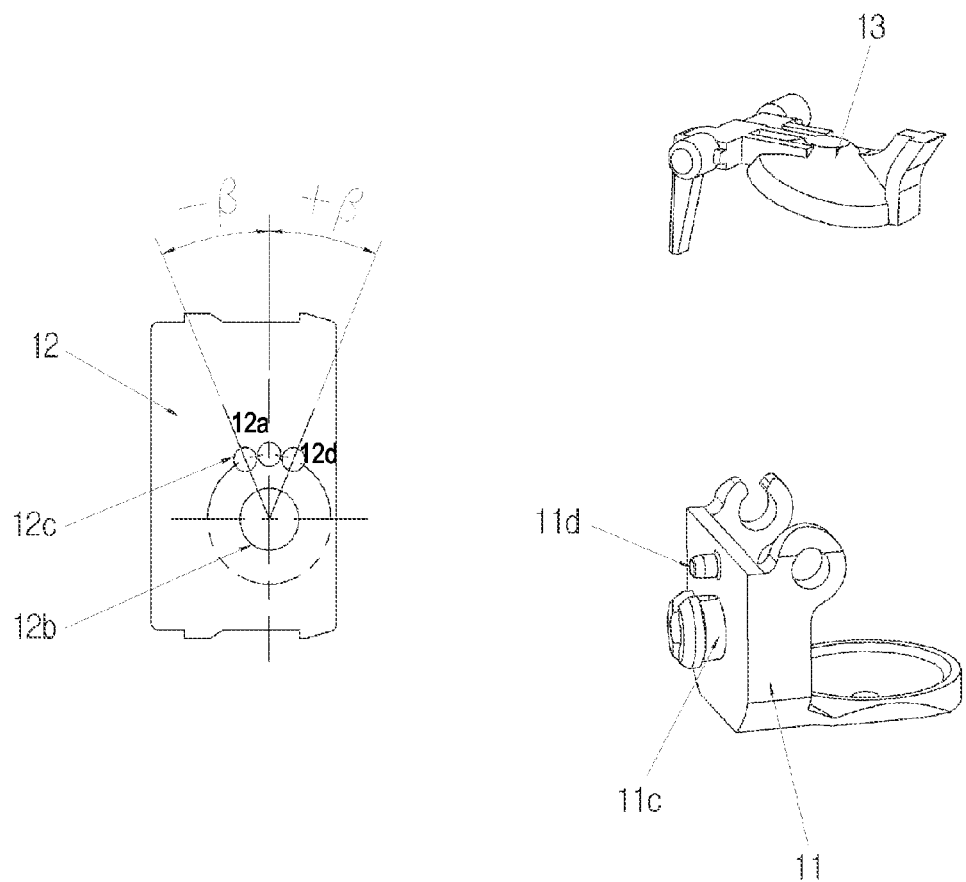
FIG. 5 is schematic representation of the components of FIG. 4.
Figure 6:
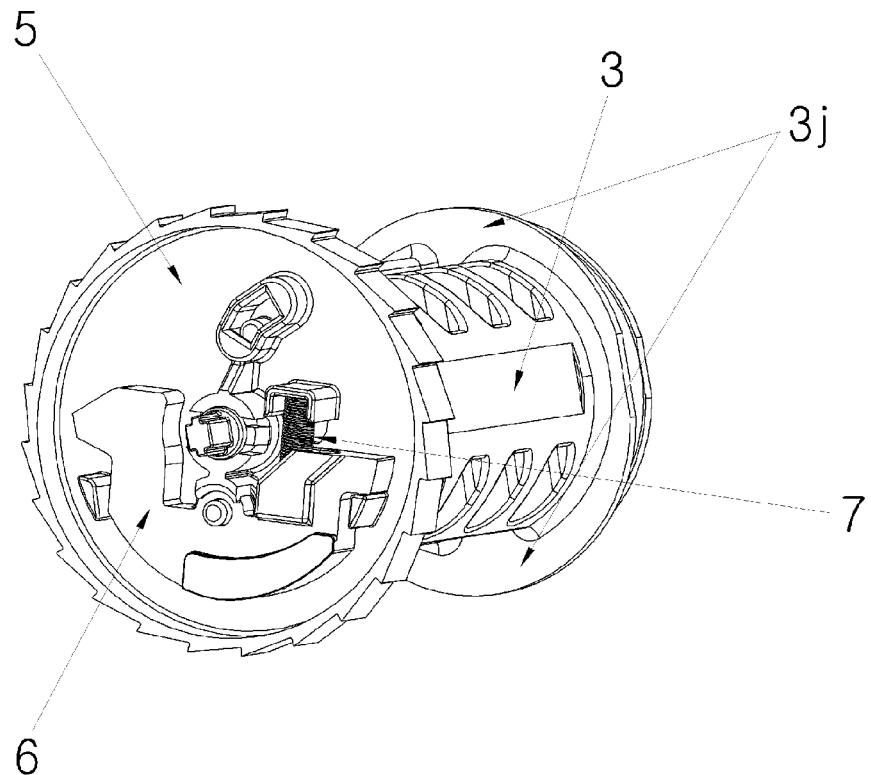
FIG. 6 is a schematic representation of the locking assembly of FIG. 2.
Figure 7:
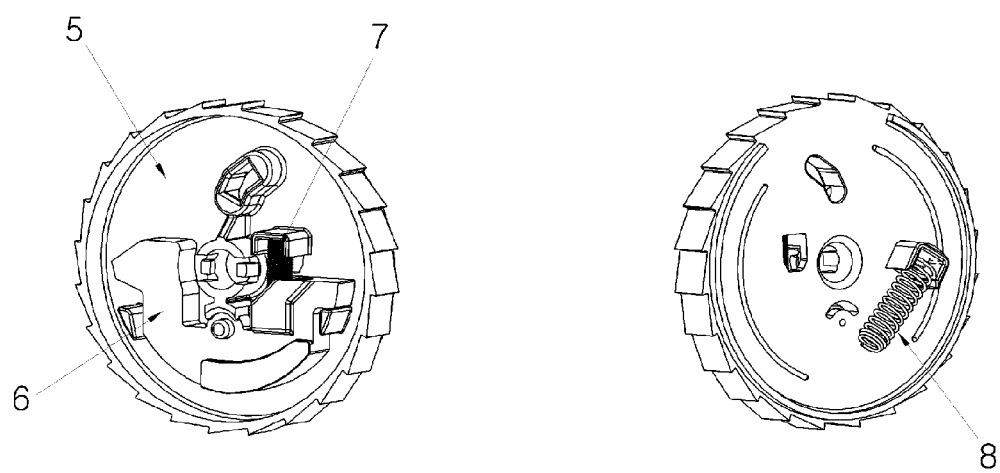
FIG. 7 is a schematic representation of the webbing assembly of FIG. 2.

FIG. 1 is a schematic representation of a seat belt retractor according to an embodiment, while FIG. 2 is schematic representation of the subassemblies of FIG. 1. FIG. 3 is a schematic representation of the frame assembly of FIG. 2. FIG. 4 is schematic representation of the detection sensor of FIG. 2. FIG. 5 is a schematic representation of the components of FIG. 4. FIG. 6 is a schematic representation of the locking assembly of FIG. 2. FIG. 7 is a schematic representation of the Webbing sensor assembly of FIG. 2, and FIG. 8 is schematic representation of the retraction spring assembly of FIG. 2.

The Frame (1) of an embodiment of the invention in the form of c contains holes on both sides, one of which has tooth holes (1a) along the arc, sporadically spaced teeth (1b), designed to reduce the rotation momentum of the spool (3) on the other side, and the Frame (1), which maintains the distance between both sides of the bending for the frame (1) and prevents deformation. An embodiment of the invention also constrains the passenger in the seat during an emergency by being constructed as assemblies of the spring cover (15), holder sensor (10), and the sensor cover (19).

In the spool (3), the protraction and retraction mechanism for webbing winding, the locking mechanism that prevents rotation in the direction of webbing protraction, the arbor (17) for rotation force transmitted from the rotation of the retraction spring (16), the formation of holes that fit the plate lock (4) supporting the load transmitted through the webbing and inhibiting the rotation of the spool (3), and the structure tolerating the stress caused by the locking force of the plate lock (4) and the teeth (1a) of the frame (1).

There is a gear (5) assembled for the locking component of the spool (3), and the gear assembly rotates together with the spool (3) in its rotation, on which the adaptor mechanism (9) is secured and attached to the holder sensor (10), so that it rotates with the frame (1).

The spool (3) contains grooves into which one end of the return spring secured on the gear (5) is inserted and fastened. The spool (3) is constructed to receive the rotation force of the retraction spring (16) and mounted on the spring cover (15) to form half an arc, which is in contact with reduced friction for the spring cover (15) while maintaining the axial point with the frame (1).

The locking mechanisms including the webbing are impacted with inertia energy for the spool (3) in a split-second during collision. Consequently, the plate lock (4) is not engaged at a proper position as it moves toward the spool (3) axis before being fully engaged with the frame (1).

A wing-shaped protrusion (3j) is formed to ensure the engagement position of the plate lock (4) and the frame (1) by preventing spool movement (3).

The detent (6) is designed to rotate at a predetermined angle by the contraction of the sensor spring (7) that supports the detent (6) when excessive velocity is applied by the gear (5) to the spool (3) during the protraction of the webbing. The gear rotation (5) that revolves the spool (3) stops as a result of the end of the detent (6) being engaged in the grooves of the holder sensor (10).

The grooves formed on the cylindrical edges of the gear (5) inhibit gear rotation (5) by being engaged with the sensor lever (13) of the sensors for vehicle stability and rapid deceleration/acceleration (25), which are actuated by the excessive velocity and the stability changes of the vehicle.

The gear (5) features the return spring assembly (26) with the hook formation to prevent slippage, which maintains free movement but does not allow slippage once it has been forcibly engaged.

One end of the return spring (8) is assembled and fastened onto the gear (5), while the other end is inserted securely into the spool (3) in order to move the gear (5) and the plate lock (4) to the original position.

The holder sensor (10) is designed to protect the webbing sensor assembly (23), maintaining the axial position of the adaptor mechanism (9) and the assembled spool. The sensor features evenly spaced arc grooves that lock the edge of the detent (6) that is actuated during excessive change of velocity for the webbing sensor operation.

The holder sensor (10) contains a detection sensor (25) to detect excessive changes in velocity and stability, and the bracket holder (12) is mounted thereon.

The detection sensor for vehicle stability (25) is designed to detect the vehicle's stability according to the installation angle or excessive changes in velocity, which move the sensor lever (13) up or down, actuated by the sensor ball (14) moving on the biased cylindrical side of the sensor bracket (11).

The sensor lever (13) is designed for retraction by being built onto the sensor bracket (11), and the interior of the sensor lever (13) in the form of a cylinder is designed to be in contact with the sensor ball (14).

The sensor lever (13) at its original position inhibits gear rotation by its edge (13) being engaged with the gear (5) tooth, based on the movement of the sensor ball (14).

There exists a No. 1 (or first) cylinder (11c) that can be secured onto the fastening part of the bracket holder (12) for the sensor bracket (11). There is a No. 2 (or second) cylinder that defines the installation angle of the bracket holder (12).

The bracket holder (12) is constructed on the holder sensor (10), and contains formation of a No. 1 (or first) hole (12b), and No. 2 (or a second set of) holes (12a, 12c, 12d) that lock onto the No. 1 (11c) and 2 (11d) cylinders.

One of the No. 2 holes (12a, 12c, 12d) of the bracket holder (12) is engaged with the No. 2 cylinder (11d) of the sensor bracket (11), and the horizontal installation angle for the retractor to the vehicle is maintained by the position of the No. 2 holes (12a, 12c, 12d).

The No. 2 holes (12c, 12d) that are formed on the bracket holder (12) are provided with at least one or more to the right or left on a vertical line.

The retraction spring (16), arbor (17) and the spring seat (18) are constructed on the retraction spring cover (15). The retraction spring (16) attached to the one side of the Frame (1) transfers the rotation force to the spool (3) through the arbor (17).

The arbor (17), which is mounted by one end of the retraction spring (16), is supported at the center of the spring cover (15), and has a groove formation (17a) to prevent slippage of the retraction spring (16).

The sensor cover (19) is secured on one side of the frame (1) to protect the locking mechanism.

The webbing guide (20) is attached to the upper part of the frame (1), to protect from damage on the webbing when protraction and retraction of the webbing that are wound in the spool (3) cause friction against the edge of the frame (1). It also ensures the secure operation of the webbing being wound onto the spool reel (3).

The webbing detent (21) is constructed onto one end of the webbing assembly, which ensures the secure operation of the webbing and supports the weight load at the end of the webbing.

The above mechanisms are manufactured in a sub-assembly unit as in the following descriptions in order to shorten the assembly process;

The frame assembly (22) secures the Frame (1) and the bar support (2) together, and the webbing guide (20) is mounted.

The webbing sensor assembly (23) is mounted onto the gear (5), detent (6), and the sensor spring (7) for assemblage in a good operation state of the detent (6).

The locking assembly (24) is constructed with the spool (3) and the plate lock (4) and fastens the webbing assembly (23) and the return spring (8) in a good operation state for the gear (5).

The sensors (25) for excessive changes in velocity and stability are constructed onto the sensor bracket (11), the sensor lever (13) and the bracket holder (12) to prevent the slippage of the sensor ball (14), and assembled in a good operation state of the sensor lever (13) actuated by the sensor ball (14) movement.

The return spring assembly (26) is constructed with the retraction spring cover (15), the retraction spring (16), arbor (17) and the spring seat (18), all of which are assembled in a good operation state of the retraction spring (16); and each assembly is constructed to be retracted.

INDUSTRIAL APPLICABILITY

An embodiment of the invention is intended to be used in the manufacturing industry in manufacturing a seat belt retractor of a vehicle An embodiment enables a fitting angle of the seat belt to be adjustable to a specified range of a vehicle stabilization, deceleration/acceleration sensor. An embodiment of the invention therefore enables the application of the seat belt, regardless of the vehicle model or make, without the need for redesign This also provides QA and improved assemblage through retrofitted retractors.

The invention claimed is:

1. A seat belt retractor including a holder sensor assembled on a frame, a gear that locks a rotating sensor lever assembled on a spool, a sensor bracket in which a sensor ball is housed, having a slope in the form of a conical shape that maintains a fitting angle of the retractor parallel with a vehicle's dynamics, a bracket holder that is assembled by the sensor bracket and a detection sensor for detecting the vehicle's dynamic slope and rapid acceleration/deceleration, the seat belt retractor comprising:
   a first cylinder locked with a fastening part of the bracket holder;
   a second cylinder that defines a locking angle for the bracket holder in the sensor bracket; and
   a first hole and a second set of holes linking the first and second cylinders of the sensor bracket in the bracket holder, which maintain the detection sensor built in the seat belt retractor horizontal to the vehicle based on which of the second set of holes links the second cylinder of the sensor bracket in the bracket holder.

2. The seat belt retractor as set forth in claim 1, wherein an arbor assembled to a retraction spring cover with the frame is provided with a notch in a form of an arc, which prevents slippage of a retraction spring during winding of a webbing.

3. The seat belt retractor as set forth in claim 1, further comprising:
   a frame assembly constructed with a webbing guide and secured the frame and a bar supporter;
   a webbing sensor assembly assembled with the gear, a detent mechanism and a sensor spring;
   a locking assembly mounted with the gear in a state of operative condition through the construction of the spool and a plate lock and through the fastening of the webbing sensor assembly and a return spring;
   the detection sensor constructed with the sensor bracket, rotating the sensor lever and bracket holder to prevent slippage of the sensor ball and thus maintain operation of the sensor lever through the sensor ball flow;
   a return spring assembly constructed in an operation state with a retraction spring due to a construction of a retraction spring cover, the retraction spring, an arbor, and a spring seat.

* * * * *